United States Patent Office 2,902,385
Patented Sept. 1, 1959

2,902,385

PROCESS FOR THE MANUFACTURE OF FINELY DISPERSED WATER-INSOLUBLE DYESTUFF PASTES

Hans Raab, Leverkusen-Bayerwerk, and Reinhold Hörnle, Koln-Stammheim, Germany, assignors to Farbenfabriken Bayer Aktiengesellschaft, Leverkusen, Germany, a corporation of Germany No Drawing. Application August 23, 1955
Serial No. 530,208

6 Claims. (Cl. 106—308)

The present invention relates to a new process for the preparation of finely dispersed pastes of water insoluble dyestuffs. More particularly it relates to a process for the preparation of finely dispersed pastes of water insoluble dyestuffs by treating water insoluble dyestuffs with polyglycol ethers in quantities of at least 10 percent, preferably 50 to 90 percent, referred to the water insoluble dyestuff, if desired with the addition of water or other suitable diluting agents, the mixture ratio being such that the mixture exhibits at the beginning of the kneading process a viscosity of at least 2000 centipoises, preferably 1,000,000 centipoises and more. The higher viscosity, for example 1,000,000 centipoises and more, is preferably chosen in order to accelerate the process of comminuting.

The polyglycol ethers to be employed are disclosed for example in German patent specifications Nos. 605,973 which discloses polyglycolethers obtained by reacting ethylene oxide with organic compounds containing hydroxyl groups except low molecular monovalent aliphatic alcohols, in such an amount (or polyglycolethers of such molecular weight) that in the molecule of the starting product at least one polyglycolether residue of 4 or more —$C_2H_4$— is introduced; the polyglycolethers produced according to the examples are liquid or solid substances; 667,744 which discloses polyglycolethers obtained from amino group containing organic compounds and ethylene oxide or polyglycolethers in a process similar to that described in German patent specification 605,973; the products formed should likewise contain at least one polyglycolether residue of 4 or more —$C_2H_4$— groups; 694,178 which is concerned with polyglycolethers obtained by condensing ethylene oxide or polyglycolethers with higher aliphatic carboxylic acids having a molecular weight which corresponds to the molecular weight of natural fatty acids; instead of the free acids, their esters, anhydrides or salts containing free carboxylic acid groups may be used; the resulting products which are liquid or wax-like substances should contain—as in the process of Ser. No. 605,973—at least one polyglycolether residue with 4 or more —$C_2H_4$— groups; 679,710 which refers inter alia to condensation products produced from alkylene oxides and resin alcohols (for instance abietinol or tetrahydroabietinol) or with resin amines (such as abietinylamine or abietinylmethylamine); the resinous condensates are suitable dispersing agents, plasticizers and the like; Austrian patent specification 160,871 which shows polyalkylene glycol ethers produced by condensing alkylene oxide with such aromatic or hydroaromatic hydroxyl compounds which are substituted in the nucleus by one or more aliphatic or cycloaliphatic radicals containing at least 4 carbon atoms, or by araliphatic or aromatic radicals; the products thus formed are oily, fatty or wax-like substances; German patent specification Nos. 824,949 which is directed to the use of polyglycolethers of aromatic monohydroxy compounds containing at least 3 benzene nuclei and corresponding to the formula $$(R)_m\text{—Ar—OH}$$

(Ar=radical of the benzene or naphthalene series, R= phenyl or benzyl residue, $m$, 1 or >1) as emulsifying and dispersing agents; typical polyglycolethers used in the examples are, e.g. condensation products of (a) the reaction products of benzyl chloride and o- or p-hydroxy diphenyl or naphthols or phenol with (b) 14 to 19 mol ethylene oxide; 806,671 which likewise discloses the application of certain polyglycolethers as emulsifying and dispersing agents; said polyglycolethers are produced from aromatic hydroxy compounds by oxethylating with ethylene oxide, which aromatic hydroxy compounds are substituted in the nucleus by at least two hydroaromatic, aromatic or araliphatic radicals, at least one of these radicals being a hydroaromatic residue; and British patent specification 690,355 which discloses solid, wax-like polyglycolethers obtained ". . . by reacting a polyhydric alcohol containing at least three alcohol groups with more than 20 mols alkylene oxide calculated on each alcohol group . . ."; the working examples form products having from 10.5 to 200 mols of alkylene oxide per alcohol group of the polyhydric alcohol.

Suitable kneading devices are the known mixing and kneading machines used for the intimate mixing of viscous pastes such as, for example, the well known Werner and Pfleiderer kneaders or mixing and kneading devices as described in German patent specification No. 813,154, or a continuous kneading apparatus such as the Buss-Kokneader (cf. Ullmanns Encyklopaedie der technischen Chemie, 3d edition, volume 1, page 727).

The process is effected by using the dyestuffs to be comminuted preferably in the form of a powder, but moist pastes of the dyestuffs can also be treated. Organic as well as inorganic dyestuffs may be considered among the water-insoluble dyestuffs.

The new process facilitates very rapidly the fine dispersion of the waterinsoluble dyestuffs required for various purposes. The process favourably differs therein from the processes hitherto used for this purpose. The finely dispersed dyestuff pastes thus obtained can easily be homogeneously dispersed by stirring them into aqueous or non-aqueous media in a simple manner. This property of the dyestuffs renders them suitable for all purposes where the application of finely divided waterinsoluble dyestuffs is desirable, for example, for dyeing in the spinning process of polyacrylonitrile, viscose and copper rayon, for coloring lacquers and synthetic resins, in pigment printing, for coloring paper pulp, and for the manufacture of wallpaper colors.

The following examples illustrate the invention without, however, limiting it thereto; the parts being by weight:

*Example 1*

140 parts of the monoazo dyestuff obtained from diazotized 2,5-dichloro-aniline and 2',3'-hydroxynaphthoylaminobenzene are treated in a suitable kneading device (Werner and Pfleiderer dispersion kneader) with 100 parts of the condensation product from hydroxy-diphenyl, benzyl chloride and ethylene oxide as described in Example 1 of the German patent specification No. 824,949. The viscosity of the paste lies above $10^6$ centipoises. After 30 minutes there is added sufficient water so that the paste is formed capable of flowing. The dyestuff in paste shows a uniformly fine division having a particle diameter of 0.3 to 1 micron.

*Example 2*

180 parts of the monoazo dyestuff obtained from diazotized 4-chloro-2-toluidine and 1-phenyl-3-methyl-5- pyrazolone are treated with 45 parts of the dispersing agent used in Example 1 and 30 parts of water in a kneading device described in German patent specification No. 813,154, at a viscosity above $10^6$ centipoises. After 20 minutes water is slowly added thereto until the kneading paste has acquired a flowing state enabling it to be further treated. The dyestuff then shows a particle diameter of 0.2–2 microns.

Example 3

140 parts of the disazo dyestuff obtained from diazotized o-amido-diphenyl and 3,3'-dimethyl-4,4'-diacetoacetylamino-diphenyl are treated with 140 parts of isooctylphenyl polyglycol ether according to Example 1 of Austrian patent specification No. 160,871, in a kneading device described in German patent specification No. 813,154, at a viscosity of above $10^6$ centipoises. Without further addition of water the particle size of the dyestuff dispersion thus obtained lies around 0.5 micron.

Example 4

140 parts of copper phthalocyanine are treated with 90 parts of the dispersing agent used in Example 1 in a kneading device described in German patent specification No. 813,154, at a viscosity of above $10^6$ centipoises for 60 minutes. The dyestuff then shows a fine even dispersion having a particle size of 0.5–1.5 microns.

Example 5

140 parts of the monoazo dyestuff obtained from diazotized 2,5-dichloro-aniline and 2',3'-hydroxynaphthoylaminobenzene are treated with 50 parts of the dispersing agent used in Example 1, and 100 parts of water, in a kneading device described in German patent specification No. 813,154, at a viscosity of 2700–4000 centipoises for 45 minutes.

The dyestuff dispersion obtained consists of dyestuff particles having a diameter of 0.3–1 micron. When instead of the above mixture, 100 parts of the dispersing agent and 50 parts of water are used, the viscosity of the kneading paste increases to 80–120,000 centipoises. The fineness of the dispersion corresponds to the aforementioned particle size. The dispersing agent may be added in its pure state or dissolved in the corresponding amount of water.

Example 6

120 parts of red iron oxide are treated with 120 parts of the dispersing agent used in Example 1, for 45 minutes in a kneading device described in German patent specification No. 813,154, at a viscosity of above $10^6$ centipoises. The dyestuff then shows a fineness of dispersion having a particle size of 0.2–2 microns, apart from a few agglomerates having a particle size of up to 10 microns.

We claim:

1. A process for the manufacture of finely dispersed pastes of water-insoluble dyestuffs which comprises kneading a water-insoluble dyestuff with a dispersing agent consisting essentially of a dispersive polyglycol ether in a quantity of at least 10 percent referred to the water-insoluble dyestuff, the mixture ratio being such that the mixture exhibits at the beginning of the kneading process a viscosity of 2000 up to 1,000,000 centipoises.

2. A process as claimed in claim 1 wherein the mixture contains a dispersive polyglycol ether in quantities of 50 to 90 percent.

3. A process as claimed in claim 1 wherein water is used in addition to a dispersive polyglycol ester.

4. A product obtained by the process of claim 1.

5. A product obtained by the process of claim 2.

6. A product obtained by the process of claim 3.

References Cited in the file of this patent

UNITED STATES PATENTS

| | | |
|---|---|---|
| 2,161,503 | Bush | June 6, 1939 |
| 2,404,463 | Schmidt | July 23, 1946 |
| 2,589,306 | Steiner | Mar. 18, 1952 |
| 2,623,827 | Moos | Dec. 30, 1952 |
| 2,662,031 | Vogel | Dec. 8, 1953 |
| 2,755,195 | Grubenmann | July 17, 1956 |

FOREIGN PATENTS

| | | |
|---|---|---|
| 470,181 | Great Britain | Aug. 3, 1937 |